(12) United States Patent
Hahn-Carlson et al.

(10) Patent No.: US 7,392,934 B2
(45) Date of Patent: Jul. 1, 2008

(54) TRANSACTION ACCOUNTING PROCESSING SYSTEM AND APPROACH

(75) Inventors: Dean W. Hahn-Carlson, Lilydale, MN (US); Elizabeth A. Beck, Minnetonka, MN (US); David A. Suits, Robbinsdale, MN (US)

(73) Assignee: U.S. Bank National Association, Minneapolis, MN (US)

( * ) Notice: Subject to any disclaimer, the term of this patent is extended or adjusted under 35 U.S.C. 154(b) by 35 days.

(21) Appl. No.: 11/121,158

(22) Filed: May 3, 2005

(65) Prior Publication Data

US 2005/0274792 A1 Dec. 15, 2005

Related U.S. Application Data

(60) Provisional application No. 60/578,244, filed on Jun. 9, 2004, provisional application No. 60/578,376, filed on Jun. 9, 2004.

(51) Int. Cl.
*G06Q 40/00* (2006.01)
*G07D 11/00* (2006.01)
*G07F 19/00* (2006.01)

(52) U.S. Cl. ..................... 235/379; 235/376
(58) Field of Classification Search ................. 235/379, 235/376; 705/40
See application file for complete search history.

(56) References Cited

U.S. PATENT DOCUMENTS

| 4,114,027 A | 9/1978 | Slater et al. |
|---|---|---|
| 4,270,042 A | 5/1981 | Case |
| 4,305,059 A | 12/1981 | Benton |
| 4,412,287 A | 10/1983 | Braddock, III |
| 4,567,359 A | 1/1986 | Lockwood |
| 4,713,761 A | 12/1987 | Sharpe et al. |
| 4,725,719 A | 2/1988 | Oncken et al. |
| 4,750,119 A | 6/1988 | Cohen et al. |
| 4,799,156 A | 1/1989 | Shavit et al. |
| 4,926,325 A | 5/1990 | Benton et al. |
| 4,949,272 A | 8/1990 | Vanourek et al. |
| 4,960,981 A | 10/1990 | Benton et al. |
| 5,008,827 A | 4/1991 | Sansone et al. |
| 5,025,372 A | 6/1991 | Burton et al. |
| 5,040,132 A | 8/1991 | Schuricht et al. |
| 5,043,908 A | 8/1991 | Manduley et al. |
| 5,077,694 A | 12/1991 | Sansone et al. |
| 5,117,364 A | 5/1992 | Barns-Slavin et al. |
| 5,153,842 A | 10/1992 | Dlugos, Sr. et al. |
| 5,161,109 A | 11/1992 | Keating et al. |
| 5,168,444 A | 12/1992 | Cukor et al. |
| 5,175,416 A | 12/1992 | Mansvelt et al. |
| 5,208,446 A | 5/1993 | Martinez |

(Continued)

FOREIGN PATENT DOCUMENTS

GB 2398894 9/2004

(Continued)

*Primary Examiner*—Lisa M Caputo
(74) *Attorney, Agent, or Firm*—Crawford Maunu PLLC

(57) ABSTRACT

Accounting data is classified to facilitate transaction processing and management. According to an example embodiment, data based rules are implemented for classifying transaction-related data into accounting categories. Accounting information is processed as a function of the data based rules and accordingly classified. This approach involves, for example, the identification of particular data based rules to apply to the accounting information, applying the rules and processing the information accordingly.

20 Claims, 6 Drawing Sheets

U.S. PATENT DOCUMENTS

| | | | |
|---|---|---|---|
| 5,218,188 A | 6/1993 | Hanson | |
| 5,220,501 A | 6/1993 | Lawlor et al. | |
| 5,222,018 A | 6/1993 | Sharpe et al. | |
| 5,231,569 A | 7/1993 | Myatt et al. | |
| 5,285,383 A | 2/1994 | Lindsay et al. | |
| 5,293,310 A | 3/1994 | Carroll et al. | |
| 5,329,589 A | 7/1994 | Fraser et al. | |
| 5,334,823 A | 8/1994 | Noblett, Jr. et al. | |
| 5,334,824 A | 8/1994 | Martinez | |
| 5,337,246 A | 8/1994 | Carroll et al. | |
| 5,357,563 A | 10/1994 | Hamilton et al. | |
| 5,393,963 A | 2/1995 | Thomas et al. | |
| 5,426,281 A | 6/1995 | Abecassis | |
| 5,440,634 A | 8/1995 | Jones et al. | |
| 5,485,369 A | 1/1996 | Nicholls et al. | |
| 5,631,821 A | 5/1997 | Muso | |
| 5,666,493 A | 9/1997 | Wojcik et al. | |
| 5,677,955 A | 10/1997 | Doggett et al. | |
| 5,694,551 A | 12/1997 | Doyle et al. | |
| 5,717,989 A | 2/1998 | Tozzoli et al. | |
| 5,732,400 A | 3/1998 | Mandler | |
| 5,790,790 A * | 8/1998 | Smith et al. | 709/206 |
| 5,794,207 A | 8/1998 | Walker et al. | |
| 5,806,063 A | 9/1998 | Dickens | |
| 5,842,178 A | 11/1998 | Giovannoli | |
| 5,893,080 A | 4/1999 | McGurl et al. | |
| 5,910,896 A | 6/1999 | Hahn-Carlson | |
| 5,920,847 A | 7/1999 | Kolling et al. | |
| 5,924,082 A | 7/1999 | Silverman et al. | |
| 5,930,363 A | 7/1999 | Stanford et al. | |
| 5,960,407 A | 9/1999 | Vivona | |
| 5,982,891 A | 11/1999 | Ginter et al. | |
| 5,995,976 A | 11/1999 | Walker et al. | |
| 6,021,202 A | 2/2000 | Anderson et al. | |
| 6,026,374 A | 2/2000 | Chess | |
| 6,029,150 A | 2/2000 | Kravitz | |
| 6,044,362 A | 3/2000 | Neely | |
| 6,047,268 A | 4/2000 | Bartoli et al. | |
| 6,055,519 A | 4/2000 | Kennedy et al. | |
| 6,070,150 A | 5/2000 | Remington et al. | |
| 6,131,087 A | 10/2000 | Luke et al. | |
| 6,151,588 A | 11/2000 | Tozzoli et al. | |
| 6,167,378 A | 12/2000 | Webber, Jr. | |
| 6,209,095 B1 | 3/2001 | Anderson et al. | |
| 6,223,168 B1 | 4/2001 | McGurl et al. | |
| 6,266,640 B1 | 7/2001 | Fromm et al. | |
| 6,267,292 B1 | 7/2001 | Walker et al. | |
| 6,323,894 B1 | 11/2001 | Katz et al. | |
| 6,493,685 B1 | 12/2002 | Ensel et al. | |
| 6,526,443 B1 | 2/2003 | Goldsmith et al. | |
| 6,571,149 B1 | 5/2003 | Hahn-Carlson | |
| 6,697,702 B1 | 2/2004 | Hahn-Carlson | |
| 2001/0032183 A1 * | 10/2001 | Landry | 705/40 |
| 2002/0072956 A1 | 6/2002 | Willems et al. | |
| 2002/0087344 A1 | 7/2002 | Billings et al. | |
| 2002/0087455 A1 | 7/2002 | Tsagarakis | |
| 2002/0107794 A1 | 8/2002 | Furphy et al. | |
| 2002/0120570 A1 | 8/2002 | Loy | |
| 2002/0123973 A1 | 9/2002 | Eccles et al. | |
| 2002/0161719 A1 | 10/2002 | Manning et al. | |
| 2002/0184527 A1 | 12/2002 | Chun et al. | |
| 2003/0018563 A1 | 1/2003 | Kilgour et al | |
| 2003/0126047 A1 | 7/2003 | Hollar et al. | |
| 2003/0135435 A1 | 7/2003 | Aharoni | |
| 2003/0158811 A1 | 8/2003 | Sanders et al. | |
| 2003/0191711 A1 | 10/2003 | Jamison et al. | |
| 2003/0233292 A1 | 12/2003 | Richey et al. | |
| 2003/0233321 A1 | 12/2003 | Scolini et al. | |
| 2004/0010463 A1 | 1/2004 | Hahn-Carlson | |
| 2005/0234820 A1 | 10/2005 | Mackouse | |

FOREIGN PATENT DOCUMENTS

| | | |
|---|---|---|
| WO | WO 0182193 | 11/2001 |
| WO | WO 0188813 | 11/2001 |

* cited by examiner

TRANSACTION ACCOUNTING PROCESSING SYSTEM AND APPROACH

RELATED PATENT DOCUMENTS

This patent document claims priority under 35 U.S.C. §119 to U.S. Provisional Patent Applications, No. 60/578,244, entitled "Automated Transaction Processing System and Approach" and No. 60/578,376, entitled "Transaction Data Exchange System and Approach," both filed on Jun. 9, 2004.

FIELD OF THE INVENTION

The present invention is directed to data processing interactions and, more specifically, to the management and tracking of accounting data related to transactions involving the transfer of goods and/or services.

BACKGROUND

Data transaction processing and related accounting tracking has typically involved intensive manual effort and, in instances where automatic processing has been used, intensive user intervention. For example, transaction processes involve the use of a variety of transaction documents such as orders, invoices, receipts and bills of lading (BOL). These types of transaction documents include information associated with the transaction that is used by parties to the transaction to monitor and process the transaction.

Data transaction documents are electronically processed for a multitude of different types of business applications. Interaction data (e.g., electronic or physical documents) describing characteristics of a particular transaction often includes a multitude of types of information that are presented in many different formats. In addition, when such an interaction involves the sale of a product from a seller to a buyer, there are often multiple parties to the transaction in addition to the buyer and seller, such as shippers, financial institutions, distributors and regulatory agencies (e.g., customs, taxation agencies). Often, transaction data from one party is not in a format that is readily discernible relative to data from other parties, requiring extensive effort to organize the data from different parties into categories. Parsing electronic documents and other types of data in order to identify and categorize transaction data can be a time consuming and expensive task, while also being highly susceptible to error.

A variety of transactions are particularly susceptible to processing difficulties relating to transaction data identification and categorization. For example, pre-payment reconciliation and auditing for a particular business transaction are often automatically carried out electronically at a transaction processor. Documents or other transaction information used for these functions can arrive at the transaction processor in either an untimely manner or in a format that is unsuitable for identification and categorization of the documents into particular transactions. Documents relating to a single transaction may well use different accounting codes for the same information. In addition, different users (business entities) often implement different types of accounting classification approaches, with the accounting codes being applicable to one or more accounting classifications.

Another type of incompatibility that has made transaction processing difficult is related to the common scenario wherein reference numbers or codes used by different parties to identify a particular transaction or to identify data within a transaction are not compatible. For example, in transactions involving buyers and sellers, sellers maintain transaction data organized by reference numbers or codes generated by the seller. Buyers typically must access the data using a seller's reference number or codes rather than the buyer's reference number. In addition, buyers and sellers typically use different reference numbers or codes for different characteristics of the transaction, making the monitoring and management of the transaction difficult. Moreover, other parties to the transaction wishing to obtain transaction data may well need to obtain specific access to the party's codes for classification of the data. For instance, where a monitoring agency is to gather and process transaction data such as expense and revenue data, the agency must typically learn the particular party's system in order to process expense, revenue and other data.

Expense related aspects such as payment and billing of traditional transactions are particularly susceptible to billing errors and fraud. For example, there often is little to no connection between expenditures and the type of expense in which the expenditure is to be classified. This may result in improper classification or no classification at all. Auditing errors related to improper expense classification may then also occur. In addition, other aspects of a transaction, such the entry of information into an accounting system (e.g., a General Ledger) and/or the use of data for tax or auditing purposes, can often be delayed while aspects of a particular transaction are being identified and categorized. For example, an improper expense classification may take months to discover, with associated functions (e.g., realizing a tax reduction in relation to a business expense) being correspondingly delayed.

Accounting-related information is also particularly susceptible to errors and fraud. For instance, when data on invoices or other documents is manually coded to accounting codes, there is significant opportunity for individuals to inadvertently, or sometimes even deliberately, misunderstand classification policy and record the expense against the wrong accounting code. When costs are rolled up at end of period, certain cost categories may look like they are within guideline when, in fact, significant expense have simply been booked to different accounts.

Accounting-related errors, accidental or otherwise, are detrimental for a variety of reasons. Proper accounting classification of accounting data is key to corporate compliance with rules related to the Generally Accepted Accounting Principles (GAAP) standards in general and Sarbanes-Oxley Act in particular. In fact, without reliable accounting classification, a company's profit and loss (P&L) statement generally does not provide a reliable indicator of the company's financial health.

Additional costs also arise as a result of existing inefficiencies in a variety of transaction-processing approaches. Many of the costs are individually small, but very large in the aggregate. For example, typical parties to transactions incur administrative costs including those relating to the costs for creating and delivering transaction documents, resolving billing disputes, providing a signed copy of documents to other parties and posting accounts receivable. In addition, the cost of parsing, recognizing and categorizing documents related to these and other items add to the administrative costs of transactions.

An additional challenge to transaction management involves the inability to obtain immediate information regarding a transaction. Transaction data from one party is typically not readily available to other parties to the transaction without direct access to private-party systems. Since the process is largely conducted manually, it is very difficult to track a transaction and real-time data is particularly difficult to come by. For example, there are various manual steps involved in order to learn of the status of shipment or payment. If a shipper wants to know if a carrier delivered the goods for a particular transaction and if the payment has been made, the shipper often must contact the carrier and/or the appropriate financial institution.

The above and other difficulties in the management and coordination of business transactions have presented challenges to the effective and efficient management of business transactions.

SUMMARY

The present invention is directed to overcoming the above-mentioned challenges and others related to the types of approaches and implementations discussed above and in other applications. The present invention is exemplified in a number of implementations and applications, some of which are summarized below.

According to an example embodiment of the present invention, data processing interactions are managed using an approach involving the use of transaction data based rules for classifying, categorizing and/or processing accounting-related aspects of the transactions.

In a more particular example embodiment of the present invention, rules are used to automatically classify accounting data for parties to a transaction, the rules being defined as a function of the parties and/or the transaction. Accounting information is associated with a particular set of rules and processed in accordance with the rules. In some instances, the processing involves assigning accounting codes to the accounting information. In other instances, accounting codes are assigned as a function of a transaction party for which the accounting information is being processed.

In another example embodiment of the present invention, a transaction-processing system is adapted for facilitating transactions involving merchant offerings among parties including buyers and sellers, aspects of each transaction bearing on a previously-provided agreement by the parties and being characterized by at least one transaction-based document. The system includes a data arrangement, such as databank, and a computer/processing arrangement that work together to store respective accounting codes in the databank for each of a plurality of parties. Transaction data based rules associated with the accounting codes and stored in the databank are used to apply the stored accounting codes to accounting data indicated via the at least one transaction-based document and therein, advance progress toward completion of the previously-provided agreement.

The above summary of the present invention is not intended to describe each illustrated embodiment or every implementation of the present invention. The figures and detailed description that follow more particularly exemplify these embodiments.

BRIEF DESCRIPTION OF THE DRAWINGS

The invention may be more completely understood in consideration of the detailed description of various embodiments of the invention in connection with the accompanying drawings, in which.

Figure 1:
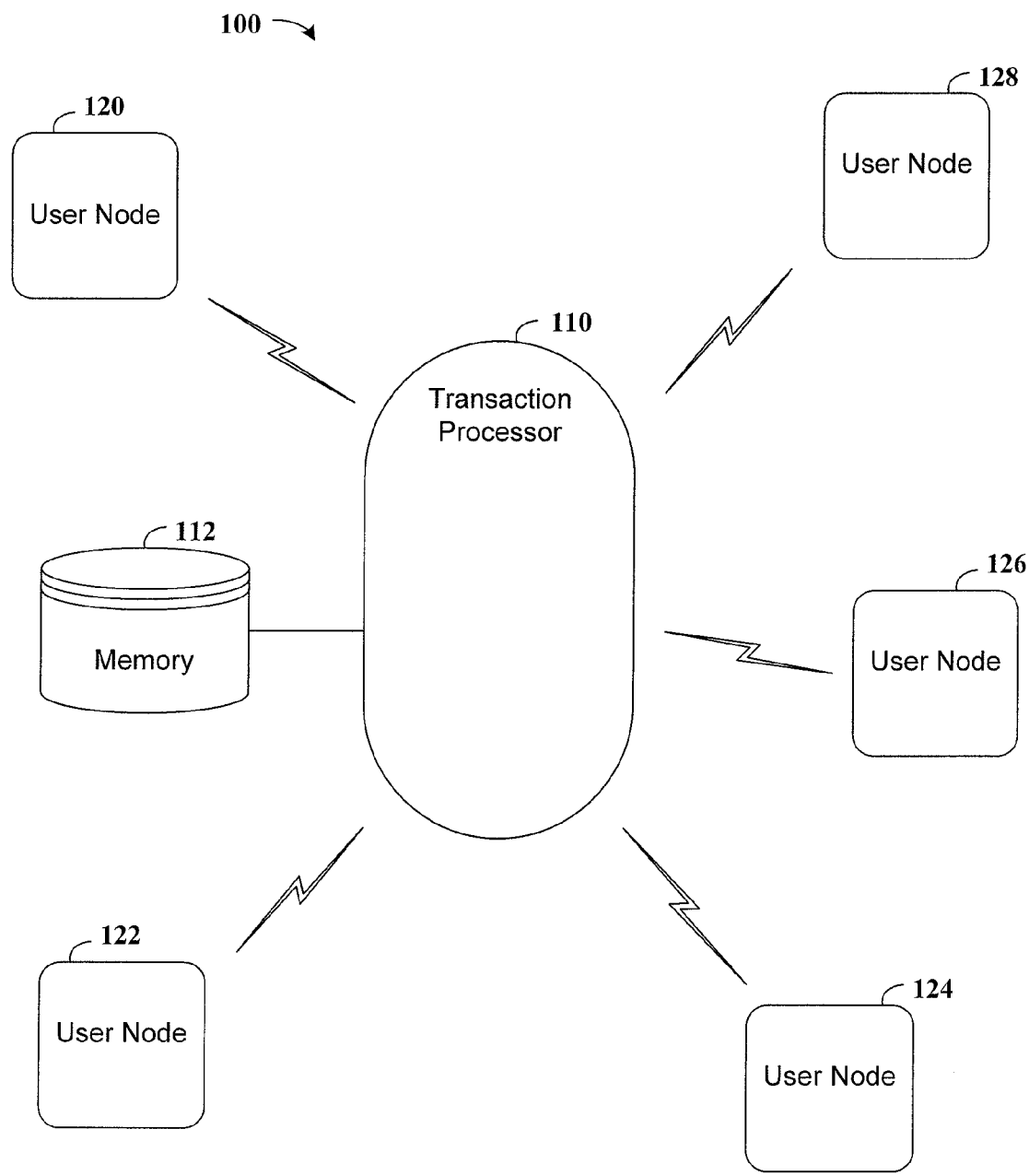
FIG. 1 shows a transaction processing arrangement, according to an example embodiment of the present invention.

While the invention is amenable to various modifications and alternative forms, specifics thereof have been shown by way of example in the drawings and will be described in detail. It should be understood, however, that the intention is not necessarily to limit the invention to the particular embodiments described. On the contrary, the intention is to cover all modifications, equivalents, and alternatives falling within the spirit and scope of the invention as defined by the appended claims.

DETAILED DESCRIPTION

The present invention is believed to be applicable to a variety of different types of business approaches and interactions, and has been found to be particularly useful for applications involving data processing of transactions including accounting data and other related aspects thereof. While the present invention is not necessarily limited to such approaches, various aspects of the invention may be appreciated through a discussion of examples using these and other contexts.

According to an example embodiment of the present invention, stored accounting-type information is used to automatically classify accounting-related data, such as expense and/or revenue data, for a particular transaction. Accounting-related data is parsed at a transaction arrangement and, using the stored accounting-type information, accounting codes are automatically applied to the accounting-related data. With this approach, discrepancies (intentional and unintentional) in the assignment of accounting codes to accounting-related data can be reduced or even eliminated.

According to another example embodiment of the present invention, data processing interactions are managed using an approach that facilitates categorization of certain interaction data including accounting data as a function of accounting code characteristics of the data. Interaction data from an accounting document and another source (e.g., another document and/or a user profile source) is used to assign data from the accounting document into one or more particular interaction categories. Accounting data such as expenses and revenues included in the interaction data is automatically categorized and, where appropriate, used to update related interaction data. For instance, expense data received from an invoice payment document can be used to automatically update appropriate ledger-type accounts as a function of expense classification functions that are predefined in a user profile. These ledger-type accounts may, for example, represent total expenditures for a particular business entity under a particular expense classification. Revenue data can be processed in a manner similar to the above-discussed processing of expense data. With these approaches, business interaction data is automatically categorized into groups that can be used to identify documents and other business interaction data under selected accounting functions.

According to another example embodiment of the present invention, a transaction-processing system includes a database having storage locations for storing user-profile attributes that correspond to a particular business entity involved in transactions managed by the transaction processing system, and for storing accounting data table information for tracking accounting-type data. The transaction processing system is adapted to categorize transaction data using the user-profile attributes to define characteristics of the categorization. For instance, accounting-type data is automatically categorized with a code assigned in accordance with the user-profile attributes (e.g., by labeling particular types of expenses with accounting codes that identify the expense as directed by the user-profile attributes as a function of the type of goods/services to which the expense applies). These codes are used in automatically storing the accounting-type data under an accounting data table location in the database.

In one implementation, users can create and manage configuration tables to facilitate the definition of accounting codes and their categorization into data table locations. These definitions are used to relate codified accounting data to a particular category automatically, for example, by storing the data in a data table location identified by the category or otherwise labeling the codified accounting data with the particular category. Using the stored location (or label) for the codified accounting data, data for a particular user is automatically related to accounting fields (e.g., for the user's General Ledger or other accounting structure).

In another example embodiment of the present invention, a transaction-processing system facilitates transactions involving merchant offerings (e.g., goods and/or services) among transaction parties including buyers and sellers. Aspects of each transaction bear on a previously-provided agreement by the parties and are characterized by at least one transaction-based document. The system includes a databank and a computer arrangement (e.g., one or more computers, and in the latter case, the computers being in communication with one another). The computer arrangement is adapted to store respective accounting codes in the databank for each of a plurality of parties. The accounting codes may, for example, relate to a particular set of expense or revenue fields specified by a particular user, with the codes further implemented for tracking the fields, e.g., in the particular user's General Ledger. These accounting codes may further relate to regulatory-type compliance rules, such as those implemented to ensure that a particular entity's accounting processes comply with legal and other standards. In this regard, the computer arrangement uses transaction data based rules associated with the accounting codes and stored in the databank to apply the stored accounting codes to expenses and/or revenues indicated via a transaction-based document. Using this association and application of accounting codes, progress toward completion of the previously-provided agreement is advanced, such as by providing information relative to a payment condition for a particular transaction and/or by generating accounting data characterizing an aspect of the agreement.

In connection with another example embodiment of the present invention, a transaction-processing system facilitates transactions involving merchant offerings among transaction parties including buyers and sellers, with aspects of each transaction being characterized by a transaction-based document. A computer arrangement accesses sets of accounting codes and transaction data based rules for applying the accounting codes to accounting data for the transaction parties. The computer arrangement further associates a transaction-based document with a set of the accounting codes for a particular party involved with a transaction to which the transaction-based document applies, using, for example, information from the transaction-based document that corresponds with stored information suggesting the association (e.g., via a common identification code). Transaction data based rules associated with the particular party are then used to apply the associated accounting codes to accounting data indicated via the at least one transaction-based document, such as by adding an accounting code to line item entries in the accounting data, and/or by storing the accounting data in a field associated with an accounting code. With this approach, the computer arrangement facilitates user access to the accounting data categorized under the set of accounting codes.

Turning now to the figures, FIG. 1 shows a transaction processing arrangement 100 including a transaction processor 110 (e.g., a computer or computer arrangement) programmed to automatically classify accounting information, according to another example embodiment of the present invention. The transaction processor 110 is in communication with a memory arrangement 112 where transaction-related information including sets of rules for classifying accounting information (e.g., accounting codes) is stored. The memory arrangement 112 (e.g., a databank or series of databanks) is shown coupled to the transaction processor 110; however, in various implementations, some or all of the memory arrangement is part of the transaction processor, is located at a remote location and/or includes a plurality of data storage circuits and/or media at different locations.

A plurality of user nodes 120, 122, 124, 126 and 128 are communicatively coupled with the transaction processor 110. The user nodes 120-128 may include any of a variety of user-interface tools for data access involving, for example, a buyer, seller, distributor, shipper, carrier, government agency, financial institution or other type of individual, entity, group or agency that are involved in a transaction. These nodes interact with the transaction processor 110 for providing transaction-related information, such as accounting rules, orders, invoices, shipping documents, payment authorization, payment execution, customs documents, security documents and others. In addition, this transaction-related information may include applicability information relating to the information's relationship with accounting data, such as effective and expiration dates wherein the information's applicability is limited to a particular range of dates. In some instances, the nodes are used primarily as interfaces for providing data to the transaction processor 110, with users at the nodes being able to provide transaction-related information such as classification rules (e.g., according to specified formats). In other instances, the transaction processor 110 automatically accesses information from the user nodes for a variety of purposes, such as retrieving classification rules (e.g., accounting codes) or updating related accounting fields. This interaction between the nodes and the transaction processor 110 is controlled using, for example, authorization for access such as password-protected authorization and others.

When transaction data includes accounting-related data, the transaction processor 110 parses the data and automatically identifies and categorizes (e.g., classifies) the accounting-related data using rules for the particular type of data. This categorization is carried out using, e.g., a categorization engine or other programmed aspect of the transaction processor 110; where General Ledger data is involved, a General Ledger assignment engine can be implemented, in this regard, to assign General Ledger categorization or codes. Applicable rules may be tailored, for example, to a particular party to a transaction or to a particular accounting class and may involve the assignment of user-specific categorization codes, such as a General Ledger code (with assignment of codes implemented for assigning codes used to categorize accounting data into a General Ledger). The categorization information is optionally sent to parties to the transaction to which the accounting-related data applies. In addition, parties having transaction information in the memory arrangement 112 can use this categorization to monitor and report characteristics of transactions managed by the transaction processor 110. Accounting rules stored at the transaction processor 110 can also be assessed at one of the user nodes and/or directly at the transaction processor.

In one implementation, the transaction processor 110 is adapted to automatically apply transaction data based rules for assigning accounting codes to transaction data when new transaction-based data is received (e.g., in a transaction document). The rules are used by an assignment engine, either part of or separate from the transaction processor 110, to assign the accounting codes to the transaction data. When an update to the assignment rules is received at the transaction processor 110 (e.g., via one of the user nodes 120-128), a new call to assign accounting codes to data is made by the transaction processor and any corresponding updates are made. For instance, when a transaction data for a particular user has been assigned a particular accounting code and that user inputs an update to rules used to assign such codes, the transaction processor 110 automatically updates the code assigned to the transaction data using the updated rules. Optionally, the user providing the assignment rule update selectively control the application of the updated rules, for example where the user desires to selectively apply the updated rules to new transactions.

In some instances, the transaction processor 110 limits and/or tracks access to the assignment rules for updating the rules. For example, where the assignment rules are implemented for assigning expense codes for classifying expense data, the transaction processor 110 is implemented to limit user access to the assignment rules to inhibit undesirable manipulation of the rules and of data associated with the rules. In this regard, an entity implementing the transaction processor 110 can ensure that proper expense classification is carried out by limiting access to expense classification rules and further by automating the classification process, thereby limiting the chance for error or intentional manipulation of accounting data.

The transaction processor 110 assigns prices as a function of the assigned accounting codes in connection with another implementation. The prices are associated with particular accounting codes in the memory arrangement 112 using, for example, user profile information to set the prices. When accounting data is assigned a particular accounting code that further includes a price or price structure, the according price or price structure is automatically assigned to the accounting data.

In another implementation, the transaction processor 110 parses and groups transaction documents using common attributes to automatically group documents relating to a particular transaction together. This automatic categorization may involve, for example, automatically associating a particular transaction document with one or more users and subsequently using profile attributes for that user to define the application of accounting codes to data in the transaction document. In one particular example, documents are grouped into categories defined by anchor-type information as discussed in connection with U.S. patent application Ser. No. 10/864,761, entitled "Automated Transaction Processing System and Approach" and filed on Jun. 9, 2004, which is fully incorporated herein by reference.

In another example embodiment, the transaction processor 110 is further adapted to grant and control information exchange with the memory arrangement 112 as a function of inputs received from the nodes 120-128, such as authorization inputs and transaction-specific inputs. When users at one of the nodes 120-128 attempt to send information to or retrieve information from the transaction processor 110, authorization information from the users is used to control the information transfer. The authorization information may include, for example, access-type information (e.g., a password or user ID) or simply document information that the transaction processor 110 recognizes.

When information exchange is controlled with transaction information and one of the nodes 120-128 sends transaction data (e.g., an electronic document) to the transaction processor 110, the memory arrangement 112 is parsed to match the transaction data with stored information. If a match is found, the transaction processor 110 processes the transaction data in accordance with the stored information, e.g., using rules for assigning accounting codes. For example, where the transaction document grants authorization to effect payment by a buyer in accordance with a previously-provided agreement such as a contract, the transaction data is matched with that buyer's stored information, and the buyer's appropriate expense codes are assigned to the expense data (e.g., to individual line items). Where the transaction data indicates that payment has been received by a seller, the transaction data is matched to that seller's stored information, with the seller's appropriate revenue codes being assigned to the transaction payment data and, where appropriate, to line individual line items in the payment data.

In another example embodiment, the transaction processor 110 is adapted to store and maintain an accounting structure for a particular business entity at one of the user nodes. For example, referring to user node 128, inputs received via a user interface at the user node are processed by the transaction processor 110 to create a memory arrangement for the business entity. Profile-type information, such as rules for assigning accounting codes and user access authorization as discussed above, is also inputted via the user interface at user node 128. With this information, the transaction processor 110 assigns accounting codes and controls access to information stored for the business entity in maintaining the accounting structure. For instance, when profile-type information directs that a particular type of expense be classified into an accounting category identified with a particular accounting code, that accounting code is assigned to the expense. Such profile-type information can be programmed into the transaction processor 110 using, for example, an algorithm-based program configured to compare transaction data with assignment rule characteristics and to generate an output code such as a valid general ledger code.

In one particular application involving the maintenance of an accounting structure as discussed above, accounting-type data such as accounting codes is loaded into the accounting structure via a data interface exchange with the business entity's accounting system. For instance, where a business entity at user node 128 employs a particular type of accounting system (e.g., hardware and software for a General Ledger system), the transaction processor 110 interfaces with the accounting system to retrieve or otherwise receive data therefrom. This data from the business entity's accounting system is then used by the transaction processor 110 to establish the accounting structure. Such data may include, for example, information used to specify effective and expiration dates (or expiration events) for account codes, which is useful for proactively loading this information to ensure timely handling of the expiration of the account codes.

In another example embodiment, accounting codes used by the transaction processor 110 are selectively loaded with information defined by the transaction processor and/or by users at one or more of the user nodes 122-128. For instance, some or all of a particular accounting code can be based on, for example, particular data values within a transaction to which the code is applied or defined combinations of transaction data. In an example transaction involving an order from Subsidiary "S" and Warehouse "W" for product class "P," the order could be directly classified to accounting code involving identification characteristics for "S," "W" and "P" such as code "SSS/DDD/CCCCCC" where each character is part of the code. Accounting codes, such as General Ledger codes, can thus be defined by the transaction processor 110 as new expenses, revenues and/or other transaction aspects are encountered. These defined codes may involve predefined aspects, such as those indicating that such a defined code employ information including subsidiary, warehouse and product data as discussed above.

In another example embodiment, the transaction processor 110 monitors changes to accounting data over time. The monitored changes are used for a variety of purposes, such as for generating reports, tracking compliance and for making appropriate reversing entries to keep accounting data such as general ledger data in order. For example, when a particular accounting field in a transaction document or other transaction-related item is updated, the transaction processor monitors the update and accordingly updates associated fields (e.g., updates a user's General Ledger account).

Transaction data received at the transaction processor 110 is cross-referenced with security-type data stored in the memory arrangement 112 in accordance with another example embodiment. When transaction data matches certain security-controlled criteria, the transaction to which the transaction data belongs can be flagged or otherwise audited, for example, by government-type agencies. For instance, where an accounting classification type matches a classification that is subject to governance, data relating to the particular classification type can be automatically reported to a third party, such as a government monitoring agency.

In another example embodiment that may be implemented with reference to FIG. 1, third-party interaction with transaction data processed by the transaction processor 110 is used to audit exchange-rate information. For example, when transaction data includes information regarding a particular currency to use, third-party exchange rate data can be matched to the transaction data. This match is used to automatically assign exchange rate information to individual transactions, for example, as a function of expense-classification rules that direct the application of an exchange rate to a particular classification.

Fees are automatically assessed by the transaction processor 110, as a function of processing carried out on behalf of users at one or more of the nodes 120-128. In some applications, the fees are flat-fee based, with a flat fee assessed to particular users in accordance with processing functions for that user. In other applications, fees are assessed on a use-basis, for example, where the volume of transactions being processed corresponding to a particular fee amount. In still other applications, fees are assessed on a transaction basis, e.g., where the fee is a percentage of an amount of funds transferred in the transaction. The fees are generally assessed to the party in the transaction for which information is classified, and can be directly withheld from funds transferred for the transaction where the transaction processor 110 facilitates the transfer.

Figure 1A:
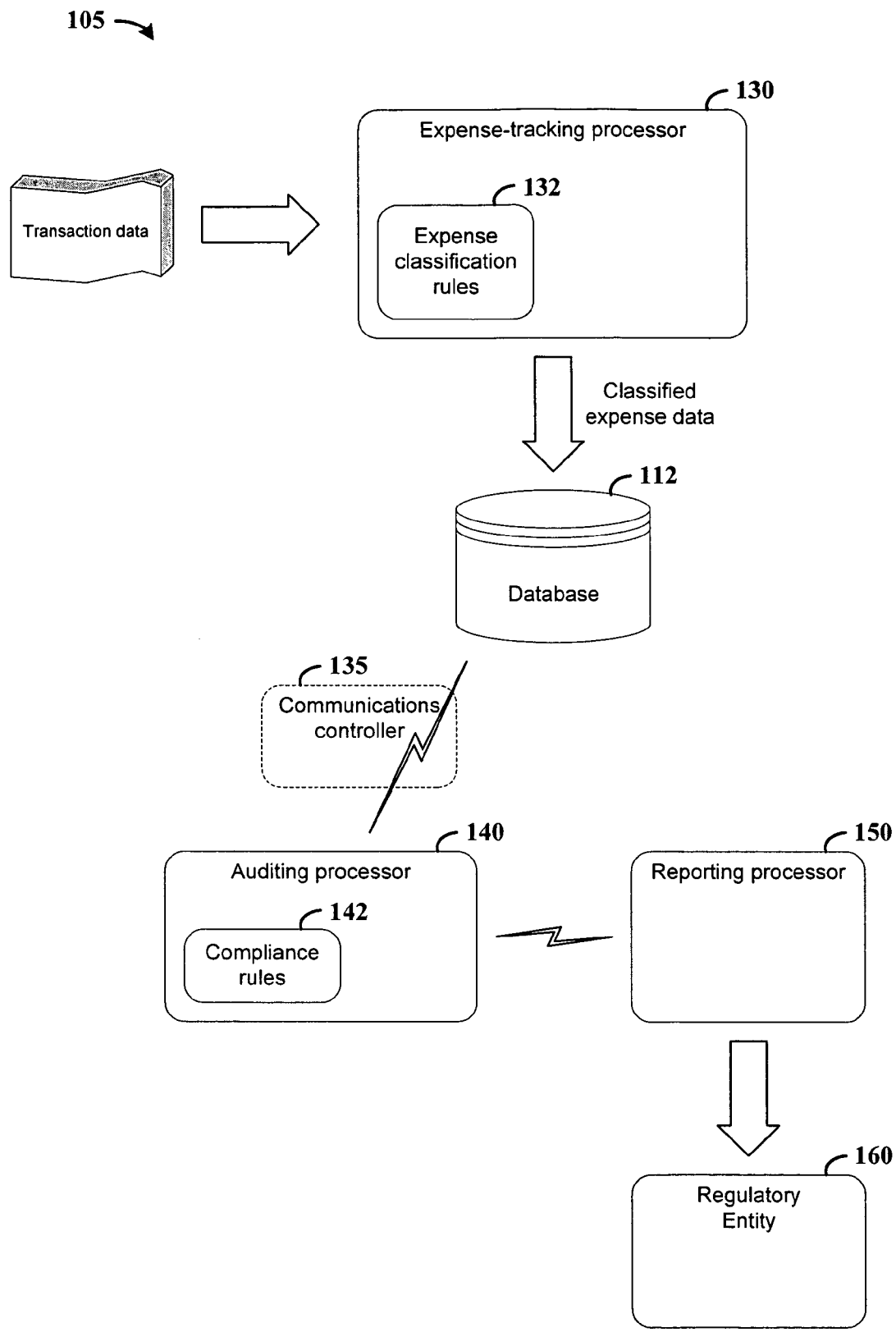
FIG. 1A shows a transaction processing arrangement for separately tracking and auditing accounting data for regulatory-type compliance functions, according to another example embodiment of the present invention.

FIG. 1A shows an expense processing arrangement 105 adapted for separately tracking and auditing transaction data for regulatory-type compliance functions, according to another example embodiment of the present invention. The arrangement 105 includes an expense-tracking processor 130, an auditing processor 140 and, in applications where outside reporting is implemented, a reporting processor 150. In some applications, multiple auditing processors are implemented for accessing classified expense data relating to different selected business entities. Where reporting is carried out via the reporting processor 150, an output from the reporting is made available to one or more entities, depending upon the reporting application. By way of example, a regulatory entity 160 is shown in FIG. 1A receiving such reporting output, with the type of accounting data being processed being expense data. This approach is also applicable to the processing of revenue, with appropriate expense functions being implemented with revenue functions.

The expense-tracking processor 130 monitors transaction data, associates tracked expense data with a tracking parameter (e.g., an expense classification code) using expense classification rules 132 and information in the transaction data, and stores the associated expense data in a memory arrangement 112, shown and labeled to correspond to the memory arrangement 112 in FIG. 1. The transaction data is provided, e.g., by one or more transaction parties in connection with an agreement such as a contract for goods and/or services. The expense classification rules 132 include classification information related to compliance-related issues and, in some applications, classification information that is entity-specific, such as classification preferences for a particular transaction party. As with the above discussion, memory arrangement 112 is selectively implemented with different data storage locations and/or approaches. In this regard, the memory arrangement 112 may include two or more different data storage locations, accessible by the arrangement 105 (and the arrangement 100) for appropriate functions.

The expense-tracking processor 130 uses transaction data from a variety of sources, depending upon the application. For example, a transaction party supplying a transaction document such as an order, an invoice or a customs document can provide the transaction data. This supplied transaction data is generally electronically delivered or otherwise made available to the expense-tracking processor 130. Where the expense-tracking processor 130 is implemented for company-wide processing, a company's transactions are made available to the expense-tracking processor 130. A business entity (e.g., relative to FIG. 1, at one of the nodes 120-128) makes its expense data available to the expense-tracking processor 130. In some implementations, the expense-tracking processor 130 processes transaction expense data on an active transaction-by-transaction basis, utilizing incoming transaction documents to automatically classify, associate or otherwise process transaction expense data on behalf of a user (e.g., a buyer or seller) while also providing tracking information for classifying expense data in accordance with applicable compliance functions. In other implementations, the expense-tracking processor 130 processes archived information maintained for a variety of transactions involving a particular business entity (e.g., as would be maintained in a company-specific accounting record), with the classification functions carried out by the expense-tracking processor focusing upon compliance-related classification.

The auditing processor 140 audits the expense data classified by the expense-tracking processor 130, using the expense classification rules 132, and stored in the memory arrangement 112. The auditing is carried out in accordance with applicable regulatory-type compliance rules to ensure that the expense data is properly classified, e.g., as relative to the use of the classified data to characterize a particular business entity's business performance and financial well-being. In this regard, the auditing processor 140 implements compliance rules 142 relating to the classification of expense data (and, where appropriate, other accounting data) to ensure that expense data is classified in accordance with the regulatory-type compliance rules. These compliance rules 142 are updated to reflect regulatory changes, and can be tailored to each particular company audited.

In some applications, the auditing processor 140 has direct access to information in the memory arrangement 112. For example, where the auditing processor and memory arrangement are implemented in a common transaction arrangement, the auditing processor 140 can routinely, actively or otherwise access the memory arrangement 112 for retrieving and auditing the classified expense data in accordance with the compliance rules 142. In this regard, the auditing processor 140 selectively accesses the memory arrangement 112 for classified expense data for a particular business entity undergoing an audit.

In other applications, a communications controller 135 is implemented with the auditing processor 140 and/or with the memory arrangement 112 for sending classified expense data to the auditing processor. The communications controller 135 directly accesses the memory arrangement 112 and selectively makes classified expense data available to the auditing processor 140. For instance, where the auditing processor 140 requests data for a particular business entity (e.g., transaction party), the communications controller 135 responds to the request by making classified expense data for the particular business entity available to the auditing processor. In some applications, this approach involves an authentication process, wherein the communications controller 135 verifies that the requested classified expense data can be delivered to the auditing processor 140 using a security parameter or other type of authentication approach. The classified expense data is communicated to the auditing processor 140 using conventional communications channels, such as the Internet (wired/wireless bussing or other network-based communications).

In some applications, the auditing processor 140 has remote security-based access to the classified expense data 112. For example, in a manner similar to that discussed above with the communications controller 135, the auditing processor may provide an authentication criterion that is used by the memory arrangement 112 (or an associated controller such as the communications controller 135 or the expense-tracking processor 130) to authenticate the auditing processor 140. The authentication generally grants data-specific access to information in the memory arrangement 112, for example, by granting access to classified expensed data for a particular business entity or a group of business entities for which the auditing processor is authenticated. In some applications, user profiles such as those discussed above are used to authenticate a particular auditing processor; these user profiles may include information stored with a profile for a particular auditing processor and/or with business entities granting access to their data. Once authenticated, the auditing processor 140 can access information in the memory arrangement 112, relative to the authentication.

Where the auditing processor 140 audits a multitude of business entities having their expense data classified and stored in the memory arrangement 112 (or another memory arrangement), profile information for each business entity is used to identify and track the results of the audit for each entity. In some applications, the profile information also includes information used by the auditing processor 140 to specifically tailor auditing functions to a particular entity. For instance, where a particular business entity requires specific auditing functions relative to the type of business it is involved with and as dictated by relevant regulatory-type compliance rules, profile information for that particular business entity reflect the specific auditing needs. Also, where a particular business entity requests a particular auditing function or approach, such as those involving report generation in a specific format or otherwise, these profiles are used by the auditing processor 140 to carry out the requested function or approach.

When implemented, the reporting processor 150 uses information generated by the auditing processor 140 to generate a report and send that report to specified recipients, such as a regulatory entity 160 as shown, or to a business entity for whom the audit is being performed.

The arrangement 105 and approach discussed herewith may be implemented with a variety of expense, revenue and other transaction processing approaches. For example, one or more of the functions shown in the arrangement 105 can be implemented in connection with the transaction processor 110 in FIG. 1. Selected functions (e.g., expense or revenue tracking, auditing and/or reporting) shown in and discussed in connection with FIG. 1A are programmed into the transaction processor 110 of FIG. 1. The transaction processor 110 carries out the functions discussed herein as associated with the respective tracking, auditing and reporting processors 130, 140 and 150.

In certain applications, both tracking and auditing functions carried out by the tracking and auditing processors 130 and 140 are implemented via the transaction processor 110 but controlled by separate entities to facilitate compliance with applicable accounting practices relative, e.g., to rules requiring the separation of such functions. For example, the Sarbanes-Oxley Act of 2002 has required that auditing services be carried out by a separate entity, relative to those carrying out non-auditing services. In this regard, user profiles or other rules at the transaction processor 110 are maintained separately for these functions and implemented such that tracking (or any non-audit service) is carried out under independent control, relative to any auditing functions. Access to the user profiles or other control characteristics relating to the tracking and auditing functions is accordingly limited using security measures such as those discussed above with FIG. 1. With this approach, tracking and auditing functions are carried out in connection with the transaction processor 110 while maintaining separate control of these functions and, accordingly, meeting compliance rules relating to such separate control.

In some applications, one or more of the tracking, auditing and reporting functions respectively carried out by processors 130, 140 and 150 are implemented at one of the user nodes 120-128. An external entity such as an auditing or expense classification entity at one of the user nodes 120-128 interacts with the transaction processor 110 to execute associated functions with transaction data processed by the transaction processor 110. As discussed above, access to data in the memory arrangement 112 can be selectively controlled by the transaction processor 110, for example as implemented with the auditing processor 140.

Fees are assessed for some or all of the processing functions shown in and described in connection with FIG. 1A. For example, where implemented with the transaction processor 110 in FIG. 1, fees can be assessed as discussed above in connection with FIG. 1. In addition, fees can be separately assessed by expense-tracking entities operating or otherwise providing the expense-tracking processor 130, either directly or via the truncation processor 110, where applicable. Similarly, fees can be separately assessed by the entities operating or providing the auditing processor 140 and its functions. These fees can be automatically assessed via the arrangement 105 (and, where implemented 100) or independently from these arrangements.

Referring again to FIG. 1A, another example embodiment of the present invention is directed to the implementation of one or more of the above approaches in connection with the management and/or processing of a user's General Ledger. The expense-tracking processor 130 interacts with transaction data and further interfaces with data in the memory arrangement 112 to track expense data relative to the General Ledger. The memory arrangement 112 is generally implemented to store a chart structure for each user's General Ledger Chart of Accounts, in addition to storing transaction data based rules for each user (e.g., as discussed with FIG. 1).

The expense classification rules 132 include General Ledger assignment rules for assigning General Ledger accounting codes to expenses. The expense-tracking processor 130 uses the General Ledger assignment rules to assign the General Ledger accounting codes, e.g., using a General Ledger assignment engine implemented via software at the expense-tracking processor 130. When transaction data is received or otherwise accessed by the expense-tracking processor 130, the stored data based rules are used to assign codes and other information, where appropriate, to the transaction data for use in loading and/or updating the General Ledger chart structure for the relevant user in the memory arrangement 112. This updated information is used by the relevant user (e.g., a buyer or seller party to a transaction) to advance progress toward completion of a transaction, for example by facilitating the user's assurance that performance of a particular transaction has been carried out such that payment for the performance is ripe.

Figure 2:
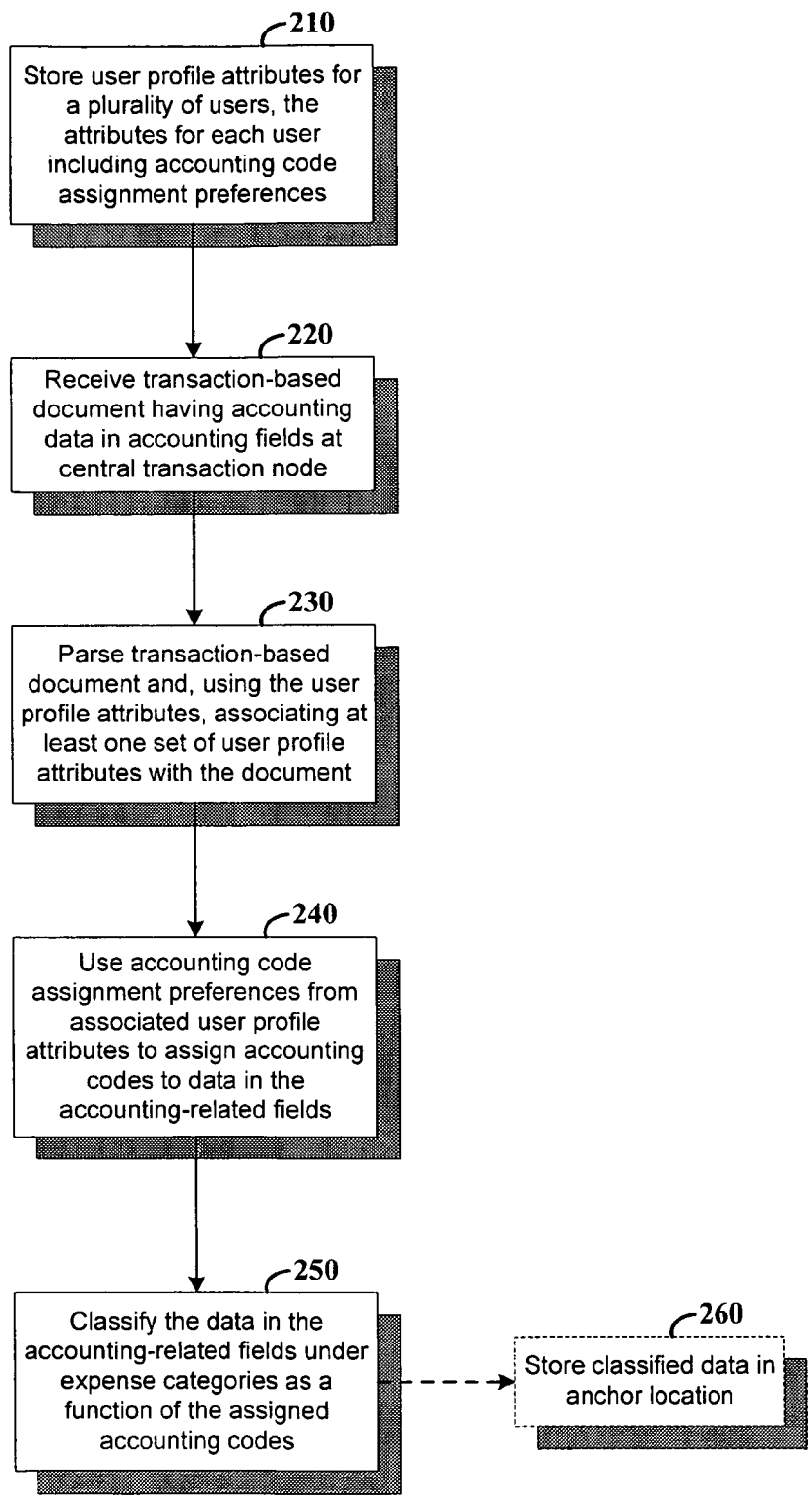
FIG. 2 is a flow diagram showing an approach for transaction management involving the application of accounting codes to transaction data, according to another example embodiment of the present invention.

FIG. 2 is a flow diagram showing an approach for transaction management involving the assignment of accounting codes to transaction data, according to another example embodiment of the present invention. The approach shown in FIG. 2 and discussed below is applicable, for example, to one or more of the approaches discussed in connection with FIG. 1. Similarly, the transaction processing arrangement 100 shown in FIG. 1 may be implemented with the approach shown and discussed with FIG. 2.

At block 210, user profile attributes are stored for a plurality of users, with each user having a set of profile attributes that include accounting code assignment preferences (e.g., in connection with transaction data based rules). At block 220, a transaction-based document is received at a transaction processor, with the document having one or more accounting-type fields with accounting data therein. The transaction-based document is parsed at block 230 and, using data from the document, one or more user profiles to which the transaction-based document applies is associated with the document. For example, by comparing owner information from the transaction-based document with owner information in stored user profiles, ownership of the document can be attributed to a particular user, from which accounting code assignment preferences can be applied. As another example, by associating the document with a particular transaction, user profiles for parties to the transaction can be associated with the transaction-based document (e.g., with the accounting data being processed differently for different parties to the transaction).

At block 240, the accounting code assignment preferences of one of the user profiles associated with the transaction-based document at block 230 are used to assign accounting codes to accounting-type data from the document. Such data may include, for example, expense-type data relating to a particular type of expense to which the transaction-based document applies, or revenue-type data relating to a revenue to which the transaction-based document applies. At block 250, the transaction processor classifies the accounting-type data from the accounting fields in the document into categories using the accounting codes. Such categories may include, for example, categories used for taxation and other auditing purposes and/or for internal tracking for purposes including entry into typical accounting-type documents, such as a General Ledger.

In one implementation, the user profile attributes stored at block 210 include tailored accounting rules for processing accounting type data from transaction-based documents. Such rules may be, for instance, provided and/or edited by users for which profile attributes are stored. When certain characteristics of the accounting-type data correspond to a particular transaction data based rule, that rule is used in applying an accounting code to the accounting-type data at block 240 and/or for further processing the data as a function of the accounting classification applied to the data.

In a more particular example embodiment of the present invention, accounting-type data is stored in an anchor location at block 260 corresponding to a particular transaction using data from the transaction-based document and stored transaction-profile attributes for a particular transaction, via which different transaction-based documents may be associated (e.g., using common attributes). The anchor location is defined as a function of transaction information and used for relating different documents pertaining to a particular transaction together. These transaction-profile attributes may, for example, include attributes stored at block 210 in connection with the storage of user profile attributes and, further, may include data that parallels user profile attributes to parties to transaction to which the transaction-profile attributes apply.

In one instance, when a particular anchor location is assigned an anchor identification (ID) that corresponds to (or, in some instances, includes) a particular accounting classification, the accounting-type data is stored in the particular anchor location for the particular accounting classification. The appropriate anchor ID effectively identifies the accounting-type data with the accounting classification and correspondingly can be further used for accounting, auditing and other purposes, simply by retrieving data assigned the particular accounting classification. For further discussions of more detailed exampled embodiments in this regard, reference may be made to U.S. Patent Document, identified by application Ser. No. 10/864,761 filed Jun. 9, 2004 and entitled "Automated Transaction Processing System and Approach," incorporated herein by reference.

Figure 3:
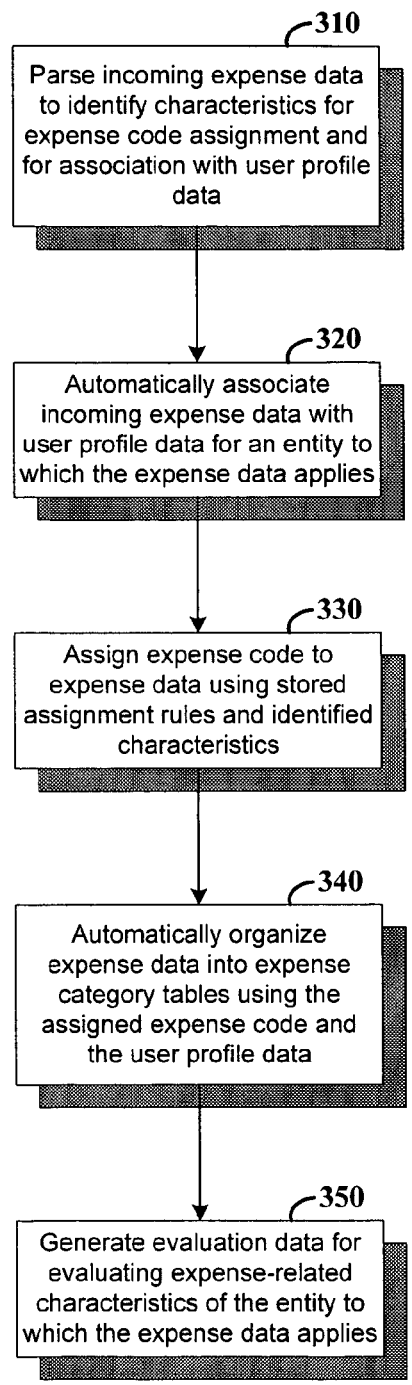
FIG. 3 is a flow diagram for transaction management involving the assignment of accounting codes to accounting data as a function of transaction data based rules and corresponding management of the accounting data, according to another example embodiment of the present invention.
Figure 4:
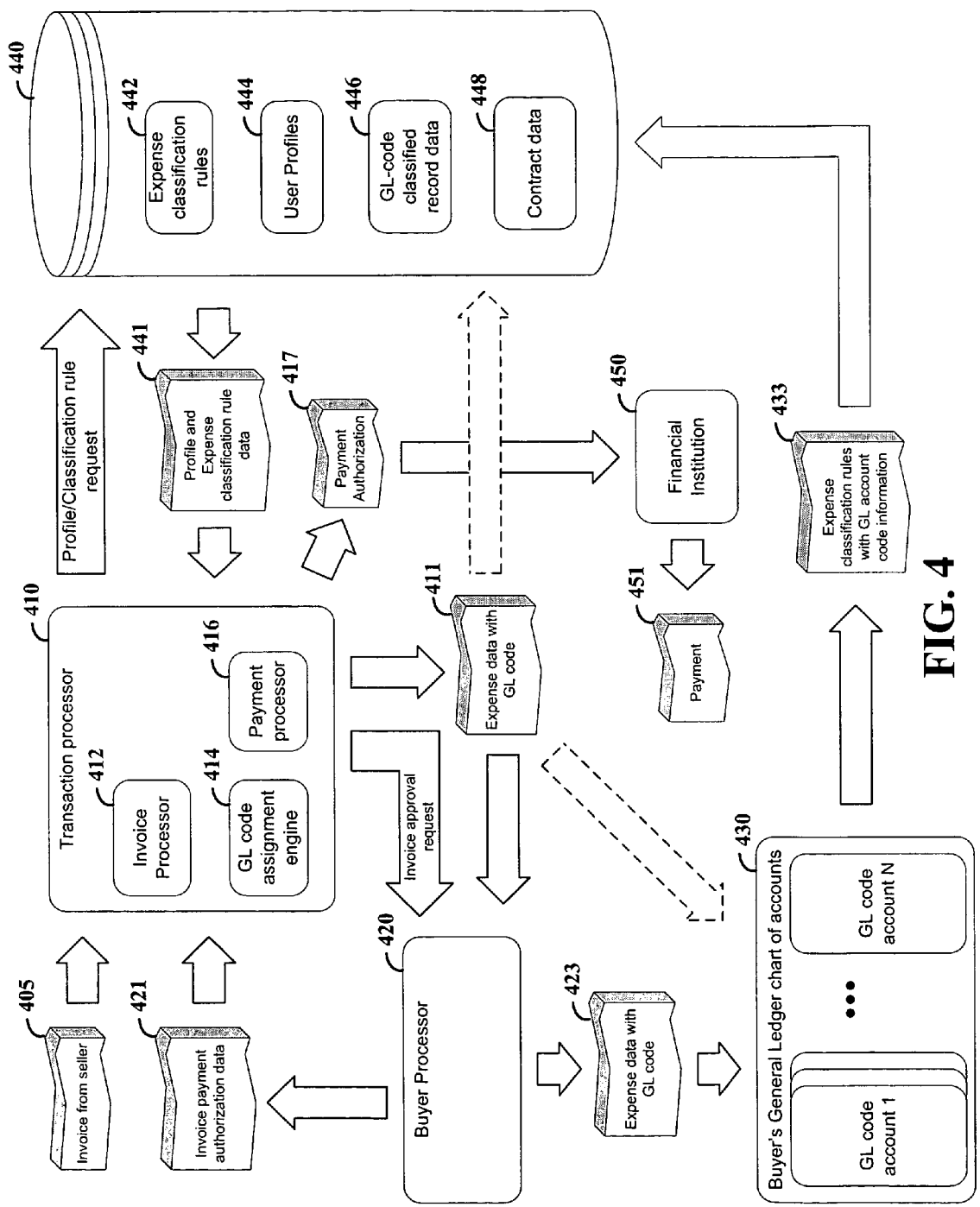
FIG. 4 is a flow diagram for an approach to transaction management with invoice approval and General Ledger account code assignment for a buyer, according to another example embodiment of the present invention.

As with FIG. 1A, the approaches shown in and described in connection with FIG. 3 and FIG. 4 are selectively implemented with revenue-classification approaches, with expense-classification functions carried out for revenue classification using revenue classification rules in place of (or in addition to) expense classification rules.

FIG. 3 is a flow diagram showing an approach to managing expense data for one or more particular entities to which the expense data applies, according to another example embodiment of the present invention. At block 310, incoming expense data is parsed to identify characteristics for use in expense code assignment and to associate the expense data with a particular user profile. The incoming expense data may, for example, be presented in the form of a transaction-based document or other type of data arrangement presenting data that can be associated with a particular transaction. Identifiable expense characteristics may include, for example, a type of good or service and/or a type of business function (e.g., manufacturing, entertainment, etc.) to which a particular expense applies.

At block 320, the incoming expense data is automatically associated with user profile data for a user (i.e., business entity) to which the expense data applies. This user may, for example, be a buyer in a transaction between the buyer and a seller, with the expense data pertaining to the goods and/or services being purchased by a buyer. Such user profile information can be stored for a multitude of business entities using, for example, a transaction management system for assigning expense data. The association between the expense data and the user profile data uses information in the expense data, or in a document or other data arrangement in which the expense data is presented, for comparing with user profile data and identifying a match therebetween. The matching user profile data is thus automatically associated with the expense data.

At block 330, an expense code is assigned to the expense data using stored assignment rules that are applicable to the identified characteristics. These stored assignment rules are, for example, general rules applicable to more than one user or be tailored specifically to a user as stored in connection with user profile information and accordingly associated with the expense data at block 320. The diversity and quantity of types of accounting codes are applicable to a multitude of expense categories and accordingly can be tailored to a specific entity's particular business scenario (if specific assignment rules are used). For instance, a certain type of expense code may be established for application to entertainment expenses applicable to entertaining business clients. In other examples, the expense code is established for disposable expenses such as utility fees, the expense code is established for capital goods requiring tracking for depreciation, such as manufacturing equipment. These and other examples are readily implemented using this approach.

At block 340, data having assigned expense codes is automatically categorized into expense category tables using transaction profile data for the particular user for which the expense data is being processed. Each of the assigned expense codes (e.g., including those discussed in the preceding paragraph) can be fit into particular expense categories, some of which may overlap. These expense categories, as with the expense codes, can include a multitude of types of expense categories, depending upon the implementation and accounting needs of the user for which the data is being categorized. In addition, the expense categories can be tiered using, for example, a general type category to encompass two or more specific categories (e.g., a single taxation category may apply to many different specific expense categories).

At block 350, expense category tables are used to generate informational data that can be used to evaluate aspects of an entity to which the categorized expense data applies. In one instance, the expense category tables can involve the use of an expense assignment approach involving the categorization of expenses for use in generating entity evaluation data for reporting business entity profitability characteristics. This entity evaluation data is useful and advantageous, for example, in tracking information for compliance with applicable accounting laws and for providing accurate business wellness information to shareholders and potential investors using, e.g., profit and loss statements and other communication tools.

FIG. 4 is a flow diagram showing an approach to transaction management with invoice approval and General Ledger account code assignment applicable to transactions involving buyers and sellers, according to another example embodiment of the present invention. A transaction processor 410 carries out invoice processing and General Ledger (GL) code assignment functions, using information stored in a database 440. A buyer processor 420 implemented, e.g., at a buyer's location and/or in connection with the transaction processor 410, facilitates invoice approval. Where appropriate, the buyer processor 420 also facilitates the integration of expense data with a General Ledger Chart of Accounts 430 for the buyer. Upon invoice approval, the transaction processor 410 facilitates payment via a financial institution 450.

As part of a payment process associated with a transaction between a buyer and seller, the seller sends an invoice 405 to the transaction processor 410. The invoice 405 is typically communicated in the form of an electronic document or other type of electronic data. An invoice processor 412 at the transaction processor 410 parses received invoice data to obtain information that can be used to identify the invoice, such as by identifying the seller or buyer. Using identification information, the transaction processor 410 requests user profile and expense classification rules from the database 440. The database 440 includes such user profiles 444 and expense classification rules 442 associated with a variety of buyers and sellers using the transaction processor 410. The various buyers and sellers provide the profiles 444 and expense classification rules to be associated with their particular transactions.

The expense classification rules 442 include data that is usable by the transaction processor 410, in connection with information from the invoice 405, to assign GL codes to data in the invoice. In this regard, the expense classification-rules 442 include one or more of a variety of types of assignment data that facilitate such GL code assignment. This assignment data may include information for generating a new GL code in accordance with the invoice 405, information for assigning codes using product identification information in the invoice, or others. For example, the assignment data in the expense classification rules 442 may indicate that products having a product code "ABC" are to be classified under expense category "XYZ." The assignment data may be specific to vendors (e.g., to a vendor sending the invoice 405), or general to more than one vendor. In some applications, the identification of a vendor sending the invoice 405 is used in connection with the expense classification rules 442 assigning the GL code, where a vendor identification is used solely or in connection with other information in the invoice 405 in assigning an accounting code thereto. Other expense classification rules 442 may involve computer code that is executable by the transaction processor 410, in connection with selected transaction information in the invoice 405, to generate an appropriate accounting code. In general, the expense classification rules 442 include any information specified by a transaction party and that can be used with transaction data to assign GL codes. This specified information varies from situation to situation, and thus is specifically tailored, where appropriate, to particular transaction parties. For purposes of this embodiment (and otherwise herein), the expense classification rules 442 are generated to suit specific applications and these applications are contemplated herein.

In some applications, the database 440 is implemented locally (i.e., connected and/or connected via a local area network (LAN)) with the transaction processor 410, with data requests involving memory retrieval types of request typically implemented with a personal computer or a LAN. In other applications, the database 440 is located remotely, with the profile and classification rule requests being sent, e.g., via a communications link such as the Internet, verified at the database 440 and processed as a function of content in the request such as profile identification and/or security data.

User profile and expense classification rule data 441 is sent from the database 440 to the transaction processor 410 in response to the corresponding request. The data 441 is used by the transaction processor to process the invoice 405 by generating an invoice approval request for the proper buyer (here associated with the buyer processor 420). For example, user profiles such as those discussed above can be used to associate a particular invoice with a particular transaction and/or party to the transaction, such as the buyer and/or seller.

If the invoice is approved by the buyer processor 420, invoice payment authorization data 421 is generated and sent to the transaction processor 410. The invoice is approved (or not approved), for example, using data such as profile or contract data accessible to the buyer processor 420, or manually with a human input used to approve the invoice for payment.

The transaction processor 410 responds to the invoice payment authorization data by implementing the GL code assignment engine 414 to assign a General Ledger code to the invoice. Where the invoice includes more than one item, the GL code assignment engine 414 separately assigns General Ledger codes to each line item. The transaction processor 410 uses the assigned General Ledger codes to generate expense data 411 associated with the codes and, where multiple line items are involved, with each line item and corresponding amount associated with codes relative to that line item.

The expense data 411 is sent by the transaction processor to the buyer processor 420, which in turn sends the expense data 423 for storage with the buyer's associated General Ledger Chart of Accounts 430. In some applications, the buyer processor 420 adds data to the expense data 423, relative to the received expense data 411, such as for recordkeeping or other purposes. In other applications, the transaction processor 410 sends the expense data 411 directly to the buyer's General Ledger Chart of Accounts 430, bypassing the buyer processor 420. In still other applications, the transaction processor 410 sends the expense data 411 to both the buyer processor 420 and the buyer's General Ledger Chart of Accounts 430, with the expense data 423 not being sent by the buyer processor ad indicated above.

The expense data 411 is optionally sent to the database 440 for storage with GL-code classified record data 446, with an association to the particular transaction party or parties to whom the expense data relates. This information can be subsequently accessed, for example, for tracking or other purposes, by parties to the transaction or outside parties, such as a regulatory agency.

The General Ledger code (or codes) associated with the expense data 423 is used to identify a particular account (shown as accounts 1-N by way of example) in which to post the expense data. Each account is associated with a particular unique GL code or set of unique GL codes. In this regard, expense data is placed into an account identified by an appropriate GL code.

In some applications, the transaction processor 410 is also programmed to authorize payment for the invoice (or portion thereof) indicated as authorized in the invoice payment authorization data 421. In this regard, a payment processor 416 generates payment authorization data 417, including information to identify the source and destination of funds, such as the buyer's bank or credit account and the seller's bank account. The payment processor 416 authorizes the payment using, e.g., information in the invoice, user profiles 444 and, in some instances, contract information 448 that is also returned with the profile and expense classification rule data 441.

Once payment is authorized, the payment authorization 417 is sent to a financial institution 450, such as a bank or credit institution, which in turn sends a payment 451 to the seller (or the seller's financial institution). In some applications, the financial institution 450 is the buyer's financial institution and, in other applications, the financial institution 450 is associated with the transaction processor 410 and makes the payment 451 on a credit basis on behalf of the buyer, and in turn collects from the buyer for the payment 451 plus any associated payment fees.

In some applications, communication is made between the buyer's General Ledger Chart of Accounts 430 and the database 440 for storing expense classification rules with General Ledger account code information 433. With this approach, updates made to the buyer's General Ledger Chart of Accounts 430 can be automatically updated in the database 440 for us in assigning expense classification via corresponding updates made with the expense classification rules 442.

In another example embodiment of the present invention, the transaction processor 410 and the buyer processor 420 work to reassign General Ledger codes to data stored in the buyer's General Ledger Chart of Accounts 403 in response to an update in either expense classification rules relating thereto or an update in a characterization of processed transaction data. For example, after the invoice 405 has been processed, the expense data therein has been assigned a GL code and the assigned data stored, a subsequent change to the buyer's accounting practices and/or to regulatory-type rules associated with the expense classification may require a change in classification rules. In this regard, the buyer processor 420 and/or the transaction processor 410 identifies expense data from the buyer's General Ledger Chart of Accounts 430 that is susceptible to the rule change and accordingly reassigns GL codes to the data in accordance with the above GL code assignment process. In some applications, this reassignment is carried out in response to a particular GL code expiring, relative to a timing characteristic relating to the GL code.

In one example embodiment, a system is adapted to define and manage transaction data based rules for a user's chart of accounts via a GL code assignment approach; this approach may be facilitated, for example, in connection with the approach shown in FIG. 4 and discussed above. The system is adapted for operation in a transaction-processing environment for facilitating transactions involving merchant offerings among parties including buyers and sellers, aspects of each transaction bearing on a previously-provided agreement by the parties (e.g., a contract or agreed-upon rules) and being characterized by at least one transaction-based document, such as an order or invoice. The system implements a data arrangement for each user, located individually or separately, the data arrangement storing user-specific transaction data based rules and a chart structure for each user's chart of accounts. The system also includes a transaction processor having a general ledger (GL) assignment engine and configured and arranged to facilitate the loading and storing of transaction data based rules in the data arrangement and the loading and storing of GL codes into the chart structure. The transaction processor assigns GL codes to transaction data with the GL assignment engine as a function of the loaded and stored GL codes and the transaction data based rules associated with the accounting codes. The transaction data is stored in the chart structure as a function of the assigned GL codes (e.g., line item expense data is stored under an appropriate GL code in the chart structure).

Figure 5:
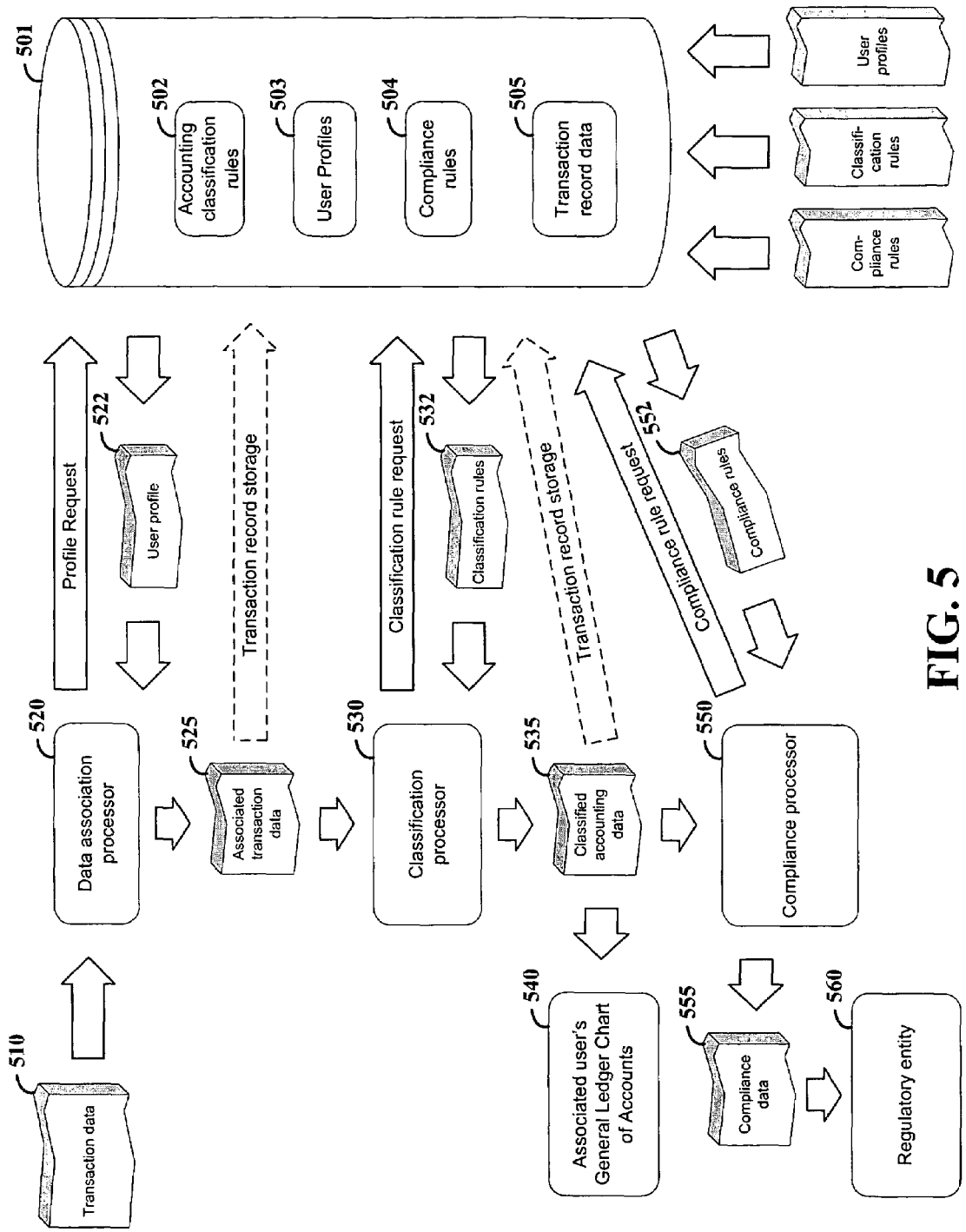
FIG. 5 is a flow diagram for an approach to transaction management with accounting data classification and compliance processing, according to another example embodiment of the present invention.

FIG. 5 is a flow diagram for a system and approach to transaction management with accounting data classification and compliance processing, according to another example embodiment of the present invention. This approach may be implemented, for example, in connection with the assignment approach described in connection with FIG. 4. In this embodiment, a data association processor 520, classification processor 530 and compliance processor 550 interact with information in a database 501 to process and/or generate accounting-related data and further to facilitate the classification of data in accordance with compliance rules 504. The database 501 stores accounting classification rules 502, user profiles 503 and compliance rules 504 provided by users (e.g., transaction parties and regulatory entities) as shown input to the database.

When transaction data 510 such as an invoice or receipt is received at the data association processor 520, the data is parsed for information that can be used to associate the data with the profile of the user sending or otherwise associated with the data, such as a buyer and/or seller who are party to a common transaction. The data association processor 520 sends a profile request to the database 501 (e.g., with a controller at the database 501 processing the request), which returns a user profile 522 that includes information that can be used by the data association processor to associate the transaction data with one or more users. The data association processor 520 sends associated transaction data 525 to the classification processor 530 and, in some applications, to the database 501 for recordkeeping.

The classification processor 530 receives and processes the associated transaction data by using the association to generate a classification rule request for retrieving accounting classification rules 502 from the database 501. For instance, where the associated transaction data specifies a particular user, the classification rule request includes information identifying that user and, where appropriate, a particular type of transaction data for use in identifying a classification type. Classification rules 532 are returned to the classification processor 530, which classifies accounting data in the transaction data by assigning a classification to each type of accounting data in the transaction data. The classification processor 530 then sends classified accounting data 535 for storage in an associated user's General Ledger Chart of Accounts 540 and to a compliance processor 550. In some applications, the classified accounting data 535 is also sent to the database 501 for storage with transaction record data 505 that can be accessed, e.g., by a party to a transaction or a regulatory entity such as entity 560.

The user's General Ledger Chart of Accounts 540 is implemented, for example, at a particular user's place of business or in connection with a managed transaction processor. In this context, and referring to FIG. 1, the General Ledger Chart of Accounts 540 is selectively implemented at user's place of business such as at user node 120 or at the transaction processor 110.

The compliance processor 550 processes the classified accounting data 535 by requesting a compliance rule from the database 501, which returns compliance rules 552 associated with the particular type of classification of the accounting data 535. These compliance rules include information such as that indicating acceptable accounting approaches for particular types of expenses and/or revenues, reporting requirements or other requirements typically associated with regulatory-type accounting rules. Where appropriate, compliance data 555 is sent to a regulatory entity 560 for use in auditing or otherwise monitoring the accounting practices of entities associated with the transaction data 510.

In another example embodiment, the accounting classification rules 502 contemplate timing aspects of a transaction with which the transaction data 510 is associated, and the accounting data is assigned a classification that includes information relating to the timing. For example, information identifying an effective time of a transaction can be set by the occurrence of a particular event, such as the payment of an invoice or the receipt of a payment. The effective time of the transaction may also involve the use of an effective start or end date, with different classifications applying to a particular transaction as relative to one or both of the start or end date. In this regard, the accounting classification rules 502 may dictate that a particular classification be assigned as relative to the timing of such an event or start/end date. For example, when a particular classification is related to an accounting code that expires at the end of an accounting period and is replaced with a new code after the expiration thereof, this information is associated with the accounting classification rules 502 and used by the classification processor 530 to appropriately classify data relative to a timing characteristic.

In some applications, the classification rule request sent by the classification processor 530 includes information indicating timing events. The classification rules 532 returned are those rules associated with the timing events.

In other applications, the classification processor 530 requests a time-unspecific set of classification rules and parses returned classification rules 532 to identify rules therein to us in classifying accounting data.

While certain aspects of the present invention have been described with reference to several particular example embodiments, those skilled in the art will recognize that many changes may be made thereto without departing from the spirit and scope of the present invention, aspects of which are set forth in the following claims.

What is claimed is:

1. A transaction-processing system for facilitating transactions involving merchant offerings among transaction parties including buyers and sellers, aspects of each transaction being characterized by a transaction-based document, the system comprising:
   a computer arrangement adapted to
      access sets of accounting codes and transaction data based rules for applying the accounting codes to accounting data for transaction parties,
      associate a transaction-based document with a set of the accounting codes for a particular party involved with a transaction to which the transaction-based document applies, and
      use transaction data based rules associated with the particular party to apply the associated accounting codes to accounting data indicated via the transaction-based document, and therein providing for user access to the accounting data categorized under the set of accounting codes.

2. The transaction-processing system of claim 1, wherein the computer arrangement is adapted to store accounting classification data in a databank for access by each party to the particular transaction, the accounting classification data reflecting application of the accounting codes to the accounting data for the particular transaction.

3. The transaction-processing system of claim 2, wherein the computer arrangement is adapted to interact with each transaction party for defining transaction data based rules for the particular transaction party.

4. The transaction-processing system of claim 1, wherein at least one of the transaction data based rules is defined as a function of time and the type of accounting data, with the at least one of the transaction data based rules being different for different times, and wherein at different times, the computer arrangement is adapted to implement the transaction data based rules to categorize the same type of accounting data in different categorizations.

5. The transaction-processing system of claim 1, wherein the computer arrangement is adapted to store the accounting data in association with an accounting code specified by third-party regulatory rules.

6. The transaction-processing system of claim 1, further comprising:
a memory arrangement adapted to store, for each of a plurality of transaction parties, sets of accounting codes and transaction data based rules for applying the accounting codes to accounting data.

7. The transaction-processing system of claim 6, wherein the memory arrangement includes at least one database.

8. The transaction-processing system of claim 1, wherein the computer arrangement is further adapted to
access sets of general ledger accounting codes for classifying accounting data into a format used by the particular party in its general ledger chart of accounts, and
apply the associated general ledger accounting codes to the accounting data.

9. The transaction-processing system of claim 8, wherein the computer arrangement is further adapted to:
post the particular party's general ledger with the accounting data as a function of the associated general ledger accounting codes.

10. The transaction-processing system of claim 1, wherein the computer arrangement is adapted to receive sets of accounting codes and transaction data based rules from transaction parties and to access sets of accounting codes and transaction data based rules for a particular transaction party by accessing received sets of accounting codes and transaction data based rules received from the particular transaction party.

11. The transaction-processing system of claim 1, wherein the transaction-based document includes transaction data characterized by a previously-provided agreement between transaction parties, and wherein the computer arrangement is further adapted to authorize payment as a function of the transaction data based rules associated with the particular party and the previously-provided agreement.

12. The transaction-processing system of claim 1, wherein the computer arrangement is adapted to access sets of accounting codes as a function of a date associated with the transaction-based document and transaction data based rules indicating an effective date of the sets of accounting codes.

13. The transaction-processing system of claim 1, wherein the computer arrangement is adapted to access relationship data that identify accounting fields that are related, and to respond to an update to accounting data in a particular accounting field by updating any accounting fields to which the particular accounting field is related.

14. The system of claim 1, wherein the computer arrangement is adapted to
access sets of accounting codes and transaction data based rules for applying the accounting codes to accounting data for transaction parties by identifying a set of accounting codes that are valid for the particular party,
associate a transaction-based document with a set of accounting codes for a particular party involved with a transaction to which the transaction-based document applies by associating the transaction-based document with the identified set of valid accounting codes, and
use transaction data based rules associated with the particular party to apply the associated accounting codes to accounting data indicated via the transaction-based document by using the transaction data based rules to apply accounting codes to the set of valid accounting codes and to generate accounting data for the transaction-based document.

15. The system of claim 1, wherein the computer arrangement is adapted to
access sets of accounting codes and transaction data based rules for applying the accounting codes to accounting data for transaction parties by identifying a set of accounting codes that are valid for the particular party,
associate a transaction-based document with the valid set of accounting codes for a particular party involved with a transaction to which the transaction-based document applies, and
use transaction data based rules associated with the particular party to apply at least one of the associated valid accounting codes to accounting data indicated via the transaction-based document and to generate accounting data for the transaction-based document.

16. A transaction-processing system for facilitating transactions involving merchant offerings among parties including buyers and sellers, aspects of each transaction bearing on a previously-provided agreement by the parties and being characterized by transaction-based documents that are respectively provided by the parties to the transaction, the system comprising:
a transaction-memory arrangement for
storing a plurality of sets of transaction-profile attributes, each set corresponding to a particular transaction, and
for each of a plurality of parties to the particular transaction,
storing respective accounting codes, and
providing transaction data based rules applicable to the stored accounting codes; and
a computer arrangement adapted to use the transaction data based rules to apply the stored accounting codes to accounting data indicated via the transaction-based documents.

17. The transaction-processing system of claim 16, wherein the computer arrangement is further adapted to store accounting-categorization data as part of the set of transaction-profile attributes, the accounting-categorization data reflecting application of the accounting codes to accounting data for the particular transaction.

18. The transaction-processing system of claim 17, wherein
the transaction-memory arrangement is for storing user profiles that specify, for each user, data access information and information for assigning the stored accounting-categorization data to accounting data for the user in accordance with the user's profiles, and
the computer arrangement is further adapted to provide secured access to the accounting-categorization data to users as a function of each user's profiles, the secured access including access for adding and modifying the accounting-categorization data.

19. A transaction-processing system for facilitating transactions involving merchant offerings among transaction parties including buyers and sellers, aspects of each transaction being characterized by a transaction-based document, the system comprising:
- means for accessing sets of accounting codes and transaction data based rules for applying the accounting codes to accounting data for transaction parties,
- means for associating a transaction-based document with a set of the accounting codes for a particular party involved with a transaction to which the transaction-based document applies, and
- means for using transaction data based rules associated with the particular party to apply the associated accounting codes to accounting data indicated via the transaction-based document, and therein providing for user access to the accounting data categorized under the set of accounting codes.

20. A method for facilitating transactions involving merchant offerings among transaction parties including buyers and sellers, aspects of each transaction being characterized by a transaction-based document, the method comprising:
- accessing sets of accounting codes and transaction data based rules for applying the accounting codes to accounting data for transaction parties,
- associating a transaction-based document with a set of the accounting codes for a particular party involved with a transaction to which the transaction-based document applies, and
- using transaction data based rules associated with the particular party to apply the associated accounting codes to accounting data indicated via the transaction-based document, and therein providing for user access to the accounting data categorized under the set of accounting codes.

* * * * *